US008733229B2

(12) United States Patent
Jarisch et al.

(10) Patent No.: US 8,733,229 B2
(45) Date of Patent: May 27, 2014

(54) EXTRACTION MODULE FOR A CAPSULE-BASED BEVERAGE PRODUCTION DEVICE

(75) Inventors: Christian Jarisch, Paudex (CH); Jean-Luc Denisart, Cully (CH); Antoine Ryser, Lausanne (CH); Patrick Kern, Gossan (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 13/597,707

(22) Filed: Aug. 29, 2012

(65) Prior Publication Data

US 2013/0032034 A1  Feb. 7, 2013

Related U.S. Application Data

(62) Division of application No. 11/534,036, filed on Sep. 21, 2006, now Pat. No. 8,272,319.

(30) Foreign Application Priority Data

Sep. 27, 2005 (EP) ..................................... 05021062

(51) Int. Cl.
*A47J 31/06* (2006.01)

(52) U.S. Cl.
USPC ........................... 99/289 R; 99/295; 99/302 R

(58) Field of Classification Search
USPC ................. 99/295, 302 P, 297, 289 R, 302 R; 100/341, 342, 345, 348, 349, 43, 44, 100/48, 52
See application file for complete search history.

(56) References Cited

U.S. PATENT DOCUMENTS

| 3,143,957 | A | * | 8/1964 | Cornell, Jr. | 100/349 |
| 3,209,676 | A | | 10/1965 | Zimmermann et al. | |
| 3,272,114 | A | * | 9/1966 | Rakel | 100/349 |
| 3,713,377 | A | * | 1/1973 | Arnett et al. | 99/283 |
| 4,934,258 | A | | 6/1990 | Versini | |
| 5,255,594 | A | | 10/1993 | Grossi | |
| 5,402,707 | A | | 4/1995 | Fond et al. | |
| 5,479,848 | A | * | 1/1996 | Versini | 99/287 |

(Continued)

FOREIGN PATENT DOCUMENTS

| EP | 1095006 | 5/2001 |
| EP | 144932 | 8/2004 |

(Continued)

OTHER PUBLICATIONS

Japanese Office Action issued Dec. 20, 2011 for corresponding Japanese Appln. No. 2006-260101.

*Primary Examiner* — Reginald L Alexander
(74) *Attorney, Agent, or Firm* — K&L Gates LLP

(57) ABSTRACT

A device for producing a beverage from a capsule, comprising a motor-driven extraction module which comprises a first jaw member and a cooperating second jaw member, wherein in an opened state of the extraction module the jaw members are distanced from each other while in the closed state the jaw members tightly enclose a capsule space, a motor for controlling the transfer of the extraction module between the closed and opened state, and a knee lever arrangement, being functionally connected to the motor and to at least one of the jaw members and being designed to convert the motor drive action into a closure force, i.e. a force with which the first and second jaw member are approaching each other, which is increasing during the course of the closure movement.

9 Claims, 9 Drawing Sheets

(56) References Cited

U.S. PATENT DOCUMENTS

| | | | |
|---|---|---|---|
| 5,656,316 | A | 8/1997 | Fond et al. |
| 5,755,149 | A | 5/1998 | Blanc et al. |
| 5,794,519 | A | 8/1998 | Fischer |
| 6,079,315 | A | 6/2000 | Beaulieu et al. |
| 6,253,664 | B1 * | 7/2001 | Giannelli ............ 99/302 P |
| 6,779,436 | B2 | 8/2004 | Guindulain Vidondo |
| 6,854,378 | B2 | 2/2005 | Jarisch et al. |
| 6,955,116 | B2 * | 10/2005 | Hale ............... 99/295 |
| 7,318,373 | B2 | 1/2008 | Blanc et al. |
| 2004/0112222 | A1 | 6/2004 | Fischer |

FOREIGN PATENT DOCUMENTS

| | | |
|---|---|---|
| GB | 043013 | 12/1963 |
| JP | 63-120000 | 5/1988 |
| JP | 07195197 | 8/1995 |
| LU | 37835 | 10/1959 |
| WO | 94/02059 | 2/1994 |
| WO | 96/08990 | 3/1996 |
| WO | 03/101265 | 12/2003 |
| WO | 20041/049878 | 6/2004 |
| WO | 2005/058111 | 6/2005 |

* cited by examiner

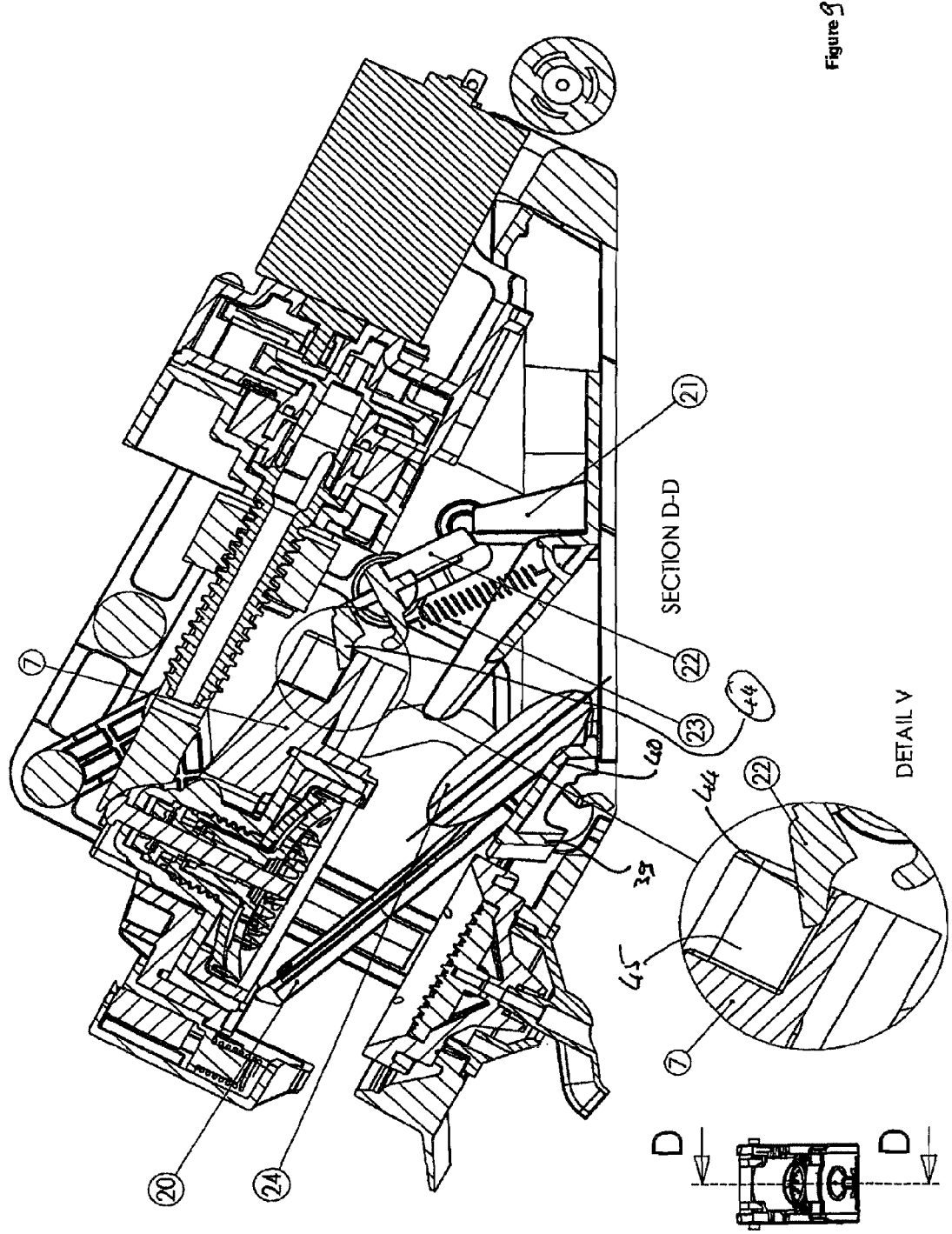

EXTRACTION MODULE FOR A CAPSULE-BASED BEVERAGE PRODUCTION DEVICE

PRIORITY CLAIM

This application is a divisional of U.S. patent application Ser. No. 11/534,036, filed on Sep. 21, 2006, which claims priority to EP 05021062.4 filed Sep. 27, 2005, the entire disclosures of which are incorporated by reference.

BACKGROUND

The present invention generally relates to the production of a beverage or a liquid comestible on the basis of a capsule, which capsule contains ingredients which are able to produce a beverage or liquid comestible when interacting with a liquid, such as for example hot pressurised water, introduced into the volume of the capsule.

Especially in the field of coffee machines, machines have been widely developed in which an initially hermetically sealed capsule containing beverage ingredients is inserted (while still being sealed) in an opened extraction module. Then the extraction module surrounding the capsule is tightly closed, water is injected at the first face of the capsule, the beverage is produced in the volume of the capsule and a produced beverage can be drained from a second face of the capsule.

Once the beverage production process is finished, the used capsule has to be removed from the extraction module.

Different approaches are known for facilitating the handling of such capsule-based beverage production machines.

EP 1 095 605 A1 teaches an ejection mechanism for such a capsule, wherein when opening the extraction module, automatically an ejector device, mechanically coupled to the opening movement, lifts the used capsule off its support.

In order to inject the liquid into the capsule, often needle-like elements are used which perforate the capsule from outside. Once the water injection and beverage production process is finished, the capsule tends to stay attached to these injection means. To overcome this problem, EP 1 444 932 A1 proposes an extraction module, which is closed linearly (in contrast to a rotational closing movement) and which comprises means for detaching a capsule from the water injection means (needles).

SUMMARY

The object of the present invention provides techniques for a reliable and simple mechanical arrangement for producing beverages from a capsule containing ingredients.

A first aspect of the present invention relates to a device for producing a beverage from a capsule, the device comprising an extraction module which comprises a first jaw member and a cooperating second jaw member.

In an opened state of the extraction module the jaw members are distanced from each other. In the closed state the jaw members tightly enclose a capsule space.

A motor drives the transfer of the extraction module between the closed and opened state.

Mechanical conversion means transmit the drive action of the motor into a relative displacement of the jaw members and have a variable transmission ratio converting the drive action of the motor into a closure force, i.e. a force with which the first and second jaw member are approaching each other. The closure force increases during the course of the closure movement. Thus the closure force reaches its maximum when it is needed most, i.e. when the jaw members have to enclose tightly any inserted capsule.

The mechanical conversion means can comprise a lever arrangement.

The lever arrangement can be connected to a spindle driven by the motor.

The rotational drive of the motor can be converted into a translational drive by having the spindle interact with a thread that is part of a drive shaft or is connected to it.

The lever arrangement can be composed of two co-parallel pairs of levers. The levers of each pair of levers can be respectively connected to each other by a knee joint. The motor can actuate directly or indirectly on the knee joint.

In the opened state of the extraction module each pair of levers can form an acute angle extending from the knee joint. In the closed state of the extraction module each pair of levers can form an obtuse angle extending from the knee joint.

The extremity of one lever of each pair of levers opposite to the knee joint can be respectively connected to one of the jaw members. The other extremity can be respectively fixed in translation.

The position and/or orientation of the motor can follow the transfer movement of the extraction module between the opened and the closed state.

Jaw member guiding means can be provided such that the jaw members are displacable along aligned trajectories when transferring the extraction module between its closed and opened state.

The device can comprise a frame for mounting the extraction module and the motor to a main part of the beverage production device.

One of the jaw members can comprise means for injecting a liquid into an inserted capsule. The respectively other jaw member can comprise means for draining a produced beverage from an inserted capsule.

The device can comprise means for actively detaching the capsule from the injection means. Thereby the detaching means can be functionally coupled to the motor-driven transfer movement of the extraction module from its closed state towards its opened state.

A further aspect of the invention relates to a device for producing a beverage from a capsule containing a beverage ingredient. The device comprises an extraction module having a first jaw member and a cooperating second jaw member. In an opened state of the extraction module the jaw members are distanced from each other while in the closed state the jaw members tightly enclose a capsule space.

A motor drives the transfer of the extraction module between the closed and opened state.

First capsule detaching means are provided for actively detaching the capsule from the first jaw member, and second capsule detaching means are provided for actively detaching the capsule from the second jaw member. Thereby the first and second detaching means can be functionally coupled to the motor-driven transfer movement of the extraction module.

The first and second detaching means can be mechanically coupled with a transfer movement of the extraction module from the closed state to the opened state such that one of the first and second detaching means is activated at a defined time after the activation of the respectively other detaching means.

At least one of the detaching means can be designed to carry out a rotational detaching movement.

A still further aspect of the present invention relates to a device for producing a beverage from a capsule (24), comprising a security sensor which enables the driving activity of the motor from the opened state to the closed state only as long as no obstacle is sensed in a space confined by the two approaching jaw members.

A still further aspect of the present invention relates to a method for operating a capsule-based beverage production system. Thereby an extraction module is transferred, driven by a motor, from an opened state, in which the capsule is inserted, to a closed state in which the extraction module tightly encloses the inserted capsule. The extraction module comprises first jaw member and a cooperating second jaw member. The driving action of the motor is mechanically converted into a closure force, i.e. a force with which the jaw members approach each other, which is increasing with the course of the closure movement.

A still further aspect of the present invention relates to a method for operating a capsule-based beverage production system, wherein an extraction module is transferred from a closed state, in which a beverage is produced from the inserted capsule while being tightly enclosed by the extraction module, to an opened state, the extraction module comprising a first jaw member and a cooperating second jaw member. Thereby the capsule (24) is actively detached from the both jaw members when the extraction module is transferred from its closed state to its opened state.

The capsule can be detached in a curved trajectory from at least one of the jaw members.

Further advantages, features and objects of the present invention will become evident from the following detailed description of an embodiment of the present invention when taking in conjunction with the figures of the enclosed drawings.

BRIEF DESCRIPTION OF THE FIGURES

FIG. 9 shows a cross-sectional view of the extraction module when in an intermediate state.

DETAILED DESCRIPTION

Before referring in detail to the figures of the enclosed drawings, a few terms will be explained:

"Beverage" encompasses both drinkable liquids and liquid comestibles such as e.g. soups.

A "capsule" is any closed receptacle which is able to contain a beverage ingredient in dry, liquid, solid or other form. The capsule can have a hard shell or a soft shell. It can be made from a single material or of a mix of materials. It can have all kinds of shapes, such as e.g. a pad or a cup-like shape. It can be hermetically sealed or not.

The term "extraction" and "extraction module" has been used as it is usually used when referring to the production of a coffee beverage. It is to be understood that this term refers to all kind of interactions between a liquid and an ingredient, such as e.g. mixing, dissolving, brewing etc.

Figure 1:
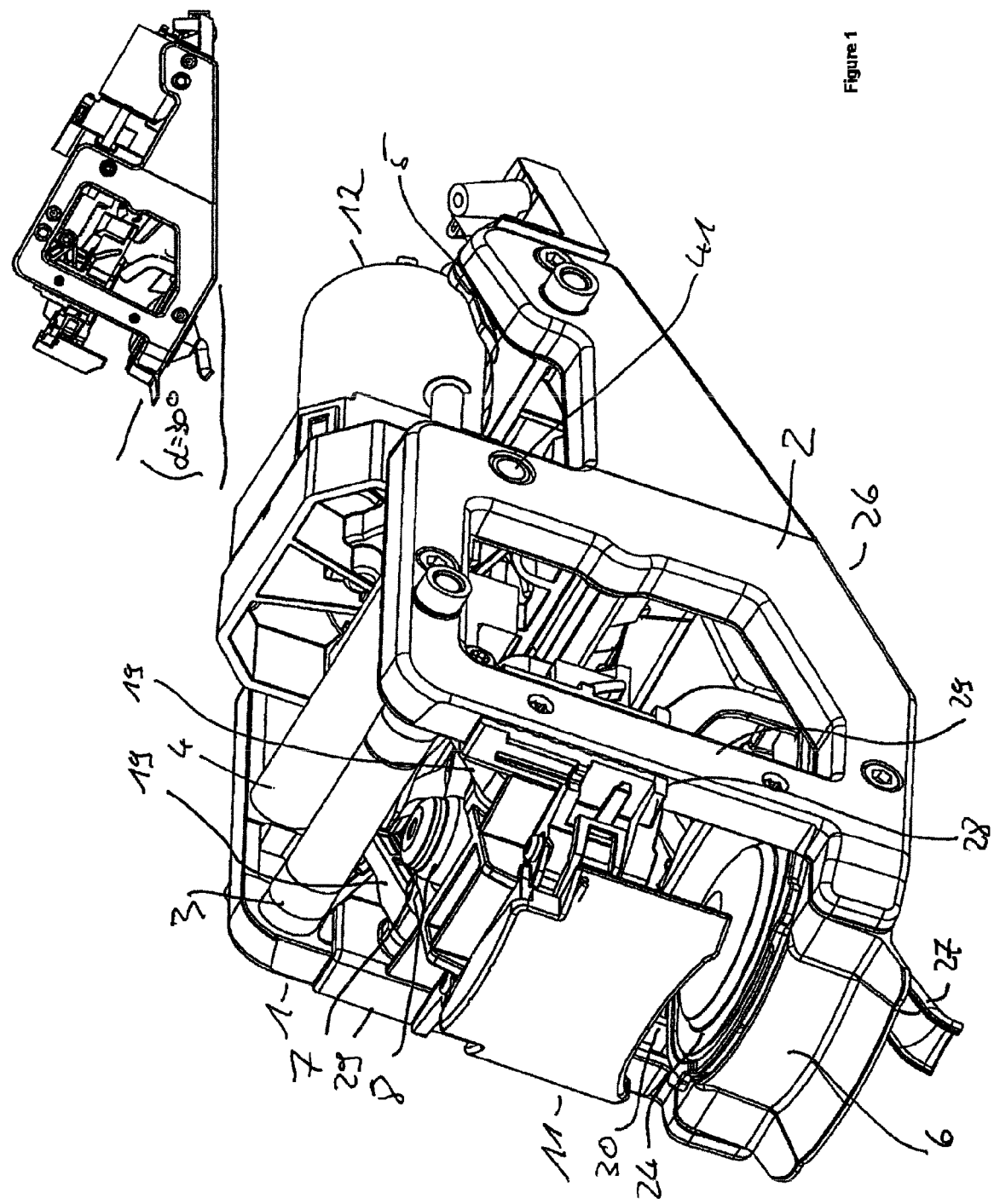
FIG. 1 shows an extraction module for a beverage production device according to the present invention.

FIG. 1 shows an overview of an extraction module of the present invention.

The extraction module for a capsule 24 can be integrated in different beverage production devices, especially coffee brewing devices. It constitutes an independent module which only needs to be connected to a supply for electricity and for pressurised water (supplied e.g. from a pump connected to a thermoblock or boiler).

As can be seen from FIG. 1, the front part of the main frame can be raised relative to the horizontal rear part by an angle between 20° and 40°, preferably 30° to the horizontal plane. Thus the capsule 24 will be received in the extraction module in a rearwards-inclined position, such that the insertion movement of a capsule 24 will be directed ergonomically slightly downwards. As will be explained later on, this rearward inclination of the capsule 24 in the extraction module also promotes the removal of a used capsule 24 to the rear of the extraction module in relation to gravity.

The elements of the extraction module are fixed to a main frame 26. The main frame 26 is composed of a left frame 1, a right frame 2, a lever axis 3, a upper frame 4, a rear frame 5 and a lower frame 6.

Generally, the extraction module is driven by an electrical motor 12 controlled by an electronic control unit (not shown in the drawings). Note that the electronic control unit is also connected to the safety system such that it can control the motor 12 depending on an output detection signal from the safety system.

The electrical motor 12 drives a mechanical transmission comprising levers 19 in order to move a first jaw, i.e. a mobile brewing head support 7 carrying the upper brewer head 8 relative to a second jaw, i.e. the lower frame 6 which (in contrast to the mobile brewing head support 7) is fixed in translation to the main frame 26 and carries a lower brewing head 9 (see FIG. 2) which is adapted to support the capsule 24.

The upper brewing head 8 presents at its lower side means to inject a liquid, such as for example hot pressurised water, into the capsule 24. The introduced liquid will then interact with the beverage or liquid comestible ingredients contained in the capsule 24. The invention encompasses all kinds of possible interactions, such as for example mixing, brewing, extracting or dissolving.

The beverage or liquid comestible being the result of the interaction of the introduced liquid and the ingredients contained in the capsule 27 can then be drained from the capsule 24 using draining means 27 connected to the lower frame 6.

The lower frame 6 together with its lower brewing head 9 constitutes a second jaw member which cooperates with the mobile brewing head support 7 and its upper brewing head 8, which together constitute a second jaw member.

Thus, the two jaw members 6, 7 can be moved relative to each other, wherein in the opened position as for example shown in FIG. 1 a capsule 24 can be inserted into the space confined by the two (distanced) jaw members 6, 7.

Starting from the opened position as shown in FIG. 1, the electrical motor 12 can drive the upper brewing head 8 to move downwards until it reaches a closed position (which will be explained later on referring to FIG. 4), in which closed position the two jaw members 6, 7 tightly confine the inserted capsule 24. The beverage production process takes place during the closed state of the extraction module shown in FIG. 4. The replacement of a used capsule 24 by a new one takes place when the extraction module has returned in its opened position as shown in FIG. 1.

The rotary drive action of the motor 12 is converted into a linear relative movement of the two jaw members 6, 7. To this regard, in the example as shown in FIG. 1, the upper brewing head 8 is guided 28 along a rectilinear column 29 being part of the main frame 26. (Actually respectively one guiding member 28 and vertical column 29 of the left frame 1 and the right frame 2, respectively, is provided at each side of the mobile brewing head support 7.)

The motor 12 is rotatably mounted to the main frame 26 at a motor block bearing axis 41.

As will be explained later on, particularly in the final approaching phase of the closure movement, the closure force, i.e. the force with which the upper and the lower jaw are approaching each other, is designed to be very high. In order to prevent both injuries of a user manipulating the extraction module and/or a damaging of parts of the shown extraction module, a security system is provided comprising a sliding door 11 and a security switch 10 (shown in FIG. 2).

Figure 2:
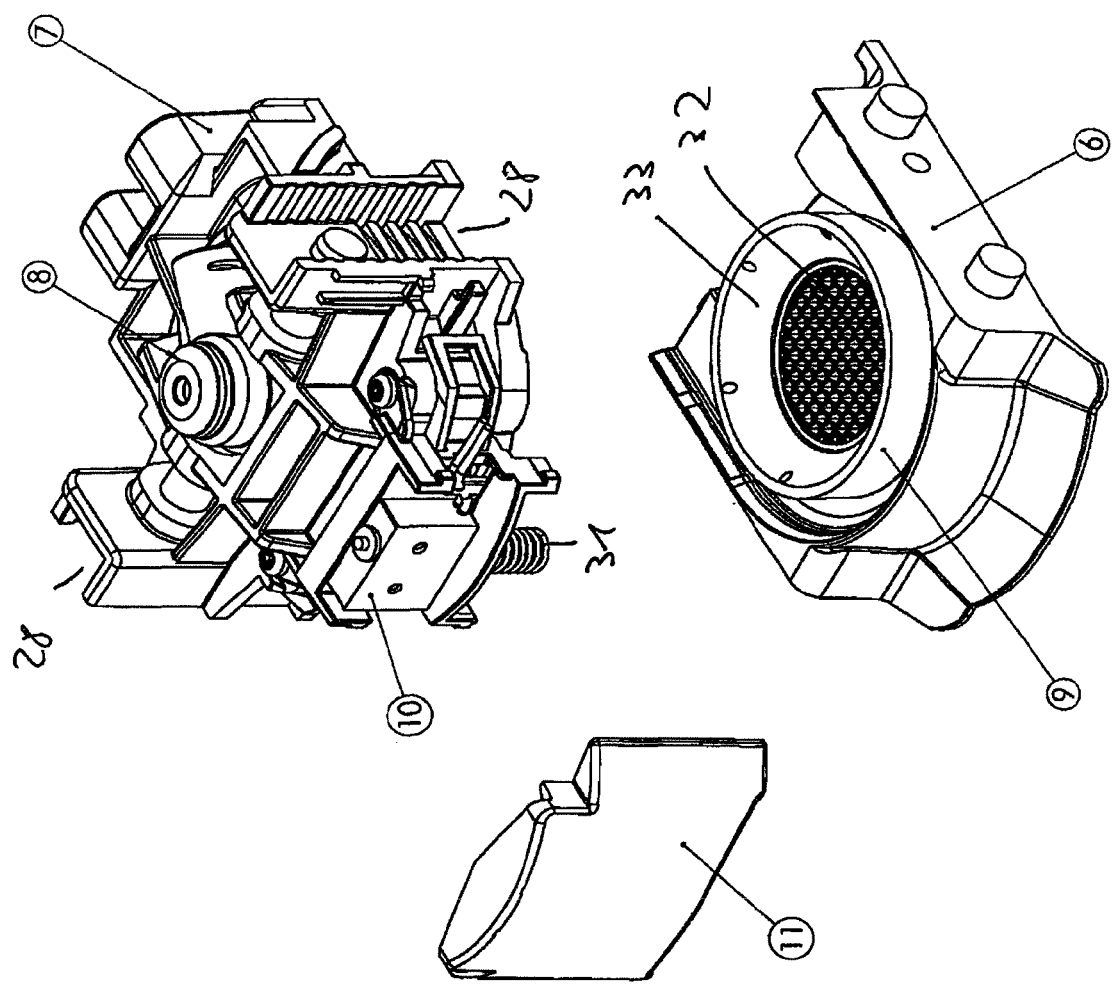
FIG. 2 shows components of the extraction module.

If ever the lower edge 30 of the sliding door 11 encounters an obstacle during its downward movement, the sliding door 11 is pushed upwards against the biasing action of a spring 31 (s. FIG. 2) such that the sliding door 11 will activate the security switch 10 which will either cause the downward movement to be stopped or which will cause the rotation direction of the electrical motor 12 to be inverted such that the upper jaw with the sliding door 11 will eventually move upwards.

FIG. 2 shows parts of the extraction module of FIG. 1, i.e. the security system comprising the sliding door 11, the spring 31 and the security switch 10. Further on, FIG. 2 shows in an exploded view the mobile brewing head support 7 carrying the upper brewing head 8. In FIG. 2 the two linear guiding means 28 can be seen which guide the mobile brewing head support 7 along the two co-parallel columns 29 of the main frame 26 (s. FIG. 1).

Finally, FIG. 2 shows a detailed view of the lower frame 6 with the lower brewing head 9.

The lower brewing head 9 comprises perforation means 32 which serve to open the lower face of the capsule 24 when the lower face of the capsule 24 is pressed against the perforation means 32.

In the shown example (s. FIG. 1) the capsule has the shape of a pad. Correspondingly, the lower brewing head 9 is provided with a frustroconical recess 33 centering the magic matching contour of the capsule 24. A produced beverage is collected in the recess 33 and then guided to the guiding channel 27 underneath.

Figure 3:
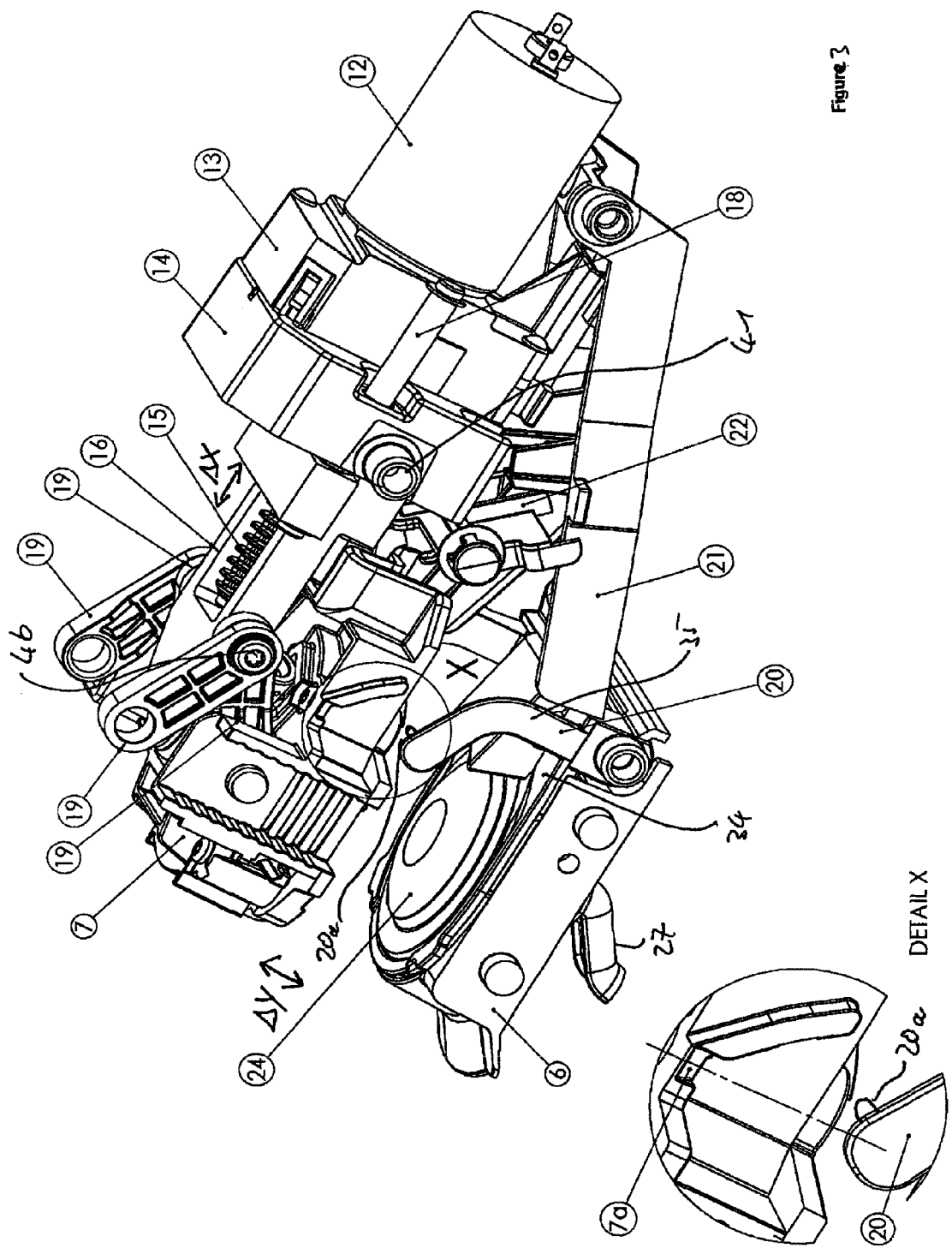
FIG. 3 shows a partial view of the extraction module in an open state.

FIG. 3 shows the enclosing unit according to the present invention without the main frame 26 in order to have a better view of the static and moveable parts housed inside and mounted to the main frame 26.

FIG. 3 shows the enclosing unit in its opened state. This can be seen from the fact that the upper brewing unit 7 is distanced from the lower frame 6 and from the upper face of a capsule 24 placed by a user on the lower frame 6.

The electric motor 12 is connected to a gear box 13 fixed to a motor block support 16.

The gear box 14 drives a spindle 15, which cooperates with a shaft having two shaft guidances 18. The shaft 16 is provided with an inner thread such that the rotational drive of the spindle 15 is converted into a translational displacement $\Delta x$ of the shaft 16.

The shaft 16 is connected to a lever arrangement being comprised of four levers 19 which are mounted in a knee-joint arrangement.

The lever arrangement comprises two coparallel pairs of levers, wherein the shaft 16 displaces translationally (s. $\Delta x$) the knee joint (connection joint) 46 of each pair of levers 19.

The upper free end of the upper lever of each pair of levers is free in rotation, but fixed in translation connected to the main frame 26 by means of a lever axis 3 (s. FIG. 1).

Therefore, as the upper free end of each pair of levers 19 is free in rotation, but fixed in translation to the main frame 26 (s. FIG. 1), the lower free end of the opposed lever 19 of each pair of levers will be moved linearly downwards when, driven by the motor 12, the shaft 16 is pushing the connection point of each pair of levers 19, to the left side in FIG. 3.

The displacement of the shaft 16 thereby is directed perpendicularly to the displacement of the free end of the lower free end of each pair of levers 19 and thus to the displacement of the mobile brewing head support 7.

The lower free end of each pair of levers 19 is rotatably connected to the mobile brewing head support 7.

As a result, the rotational drive of the spindle 15 will be converted into a translational displacement of the shaft 16, which in turn is converted into a perpendicular displacement of the mobile brewing head support 7, which is referenced as $\Delta y$ in FIG. 3.

In the opened position as shown in FIG. 3, each pair of levers forms an acute angle when seen from the connection or knee joint 46 connected to the shaft 16. Therefore, starting from the position as shown in FIG. 3 a relatively small displacement $\Delta x$ of the shaft 16 will result in a relatively large displacement $\Delta y$ of the mobile brewing head support 7. Correspondingly, in this early stage of a closure movement, i.e. a transfer movement to lower the mobile brewing head support 7, the mobile brewing head support 7 will descend relatively fast but with relatively low force.

Figure 4:
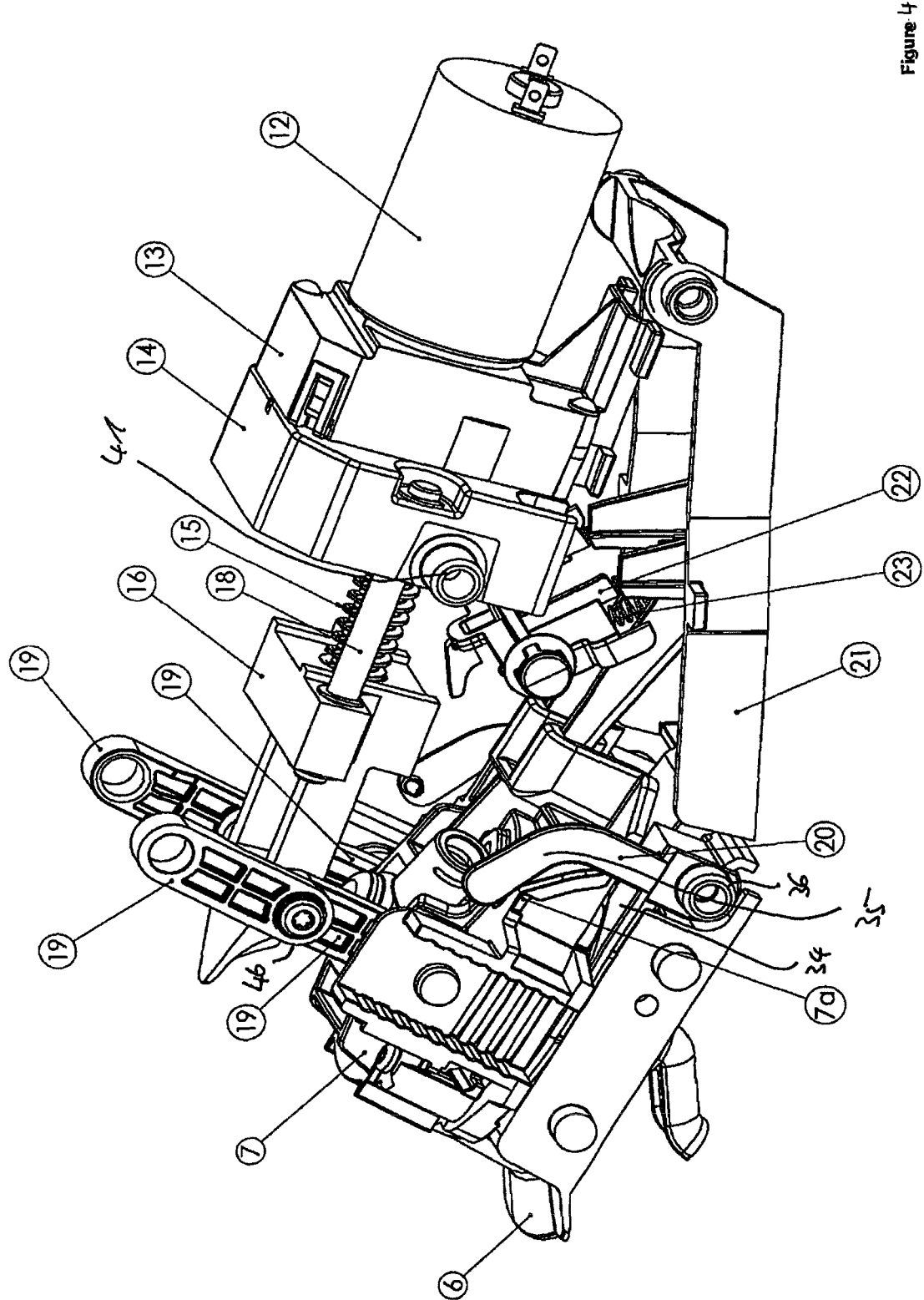
FIG. 4 shows a partial view an extraction module according to the present invention when the extraction module is in its closed state.

The more the mobile brewing head support 7 is driven downwards, the more the initially acute angle of each of the pairs 19 will be converted into an obtuse angle. At the end of the closure transfer movement (s. FIG. 4) each pair of levers can actually be aligned, i.e. they form an obtuse angle of up to 180°.

Therefore, at the end of the approaching transfer movement, i.e. when the mobile brewing head support 7 is about to abut against the lower frame 6, the same incremental displacement $\Delta x$ of the shaft 16 will be converted in a much smaller relative displacement $\Delta y$ of the mobile brewing head support 7 (when compared to the initial position as shown in FIG. 3). On the other hand, the closure force, i.e. the force with which the mobile brewing head support 7 will approach the lower frame 6 in the final phase and eventually abut against it, is much higher in this final phase of the approaching closing movement when compared to the initial stage as shown in FIG. 3.

Therefore, the lever arrangement 19 represents one example of a mechanical transmission means with varying transmission ratio during the course of the closing/opening movement. In the early stage of the closing movement (starting from the open state of the extraction module) the closure force is relatively low (and the closure speed relatively high). On the other hand, the mechanical transmission means are designed such that the final stage of the closure movement, and particularly when the mobile brewing head support 7 presses against the lower frame 6.

Note that the function of a capsule holder 21 cooperating with a steering axis 22 will be explained later on.

FIG. 4 shows a broken view when the closing system is in its closed position in which the mobile brewing head support 7 and the lower frame 6 tightly enclose a capsule confinement space.

As can be seen from FIG. 4, the motor 12 has driven the spindle 15 such that the shaft 16 is at its most advanced position (to the left in FIG. 4) and the pairs of levers 19 do no longer form an acute angle, but an angle of approx. 180°. In this closed state of the extraction module a relatively low force driven from the motor 12 will cause a very high downforce of the respectively lower lever 19 of each pairs of levers 19.

In the position as shown in FIG. 4, the beverage production process takes place. Once the beverage production process has been completed, the electronic control (not shown in the figures) will control the electric motor 12 to turn in the reverse direction, such that the spindle 15 will retract the shaft 16 such that in turn the mobile brewing head support 7 will be lifted back to the position as shown in FIG. 3.

From the above explanations and FIGS. 3 and 4 it is clear that the electrical motor 12 can be dimensioned relatively small as its torque is transmitted by mechanical transmission means (lever arrangement 19) into a closure force which is increasing with the course of the closure transfer movement.

In the following it will be explained that other movements are mechanically coupled to this main closure/opening movement of the extraction module.

Figure 5:
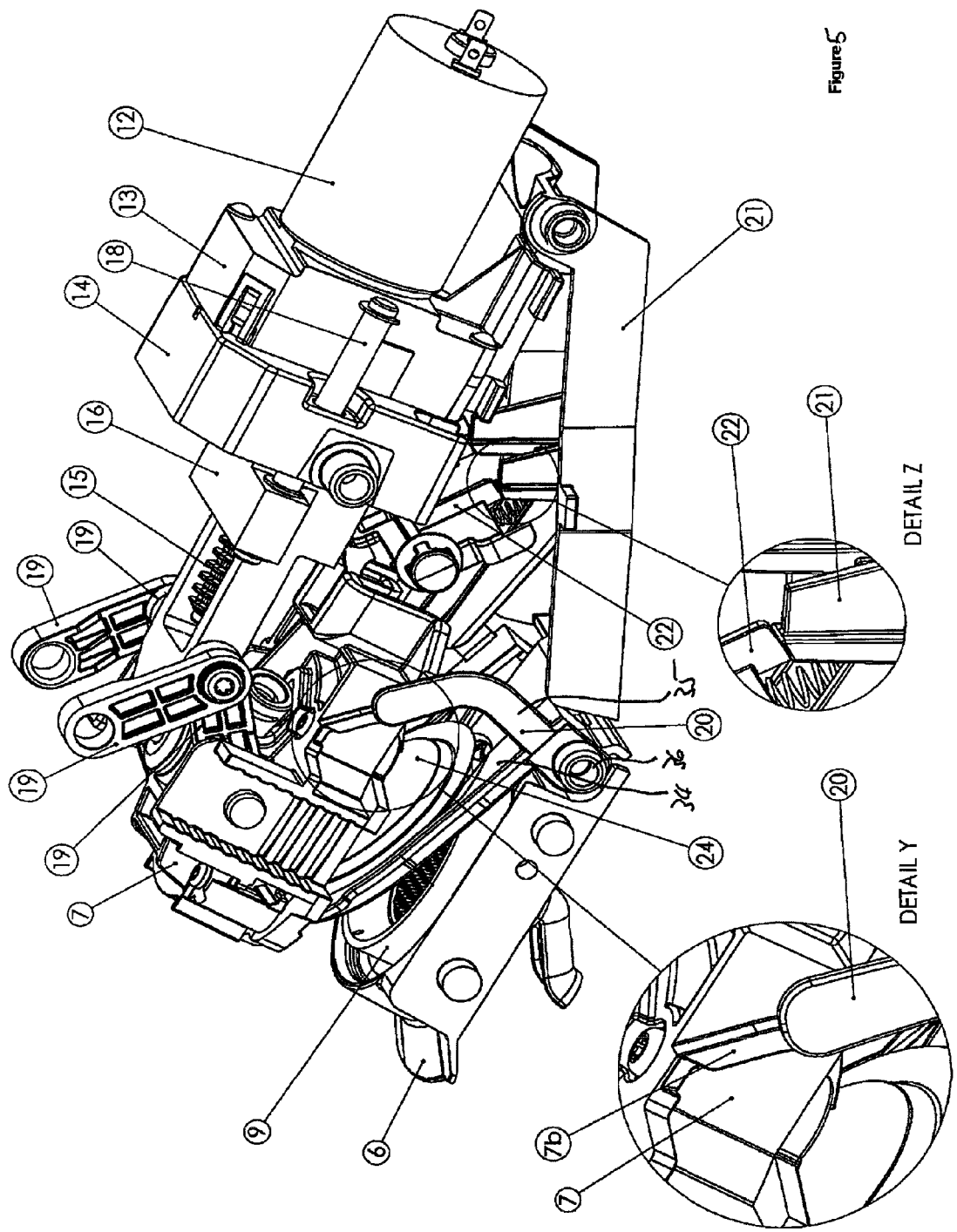
FIG. 5 shows an extraction module according to the present invention during its transfer movement from its close state to its open state.

In FIGS. 3, 4 and 5 a lower capsule detaching unit (capsule ejector) 20 is shown. As can be seen particularly from FIG. 5, the main elements of the capsule ejector 20 are essentially annular ejecting member 34 as well as an ejector control arm 35 having at its inner side (not shown in the figures) for example pins 20a engaging with inclined ramp 7b of the mobile brewing head support 7.

Starting from FIG. 3, when the mobile brewing head support 7 is moved linearly downwards, the extremity of the control arm 35 having an inner pin 20a will slide over the ramp 7a until the free extremity of the control arm 35 will be placed at the most inner position of the inclined ramp 7a when the extraction module reaches its closed state as shown in FIG. 4.

On the other hand, when a capsule is inserted into the capsule insertion space between the lower frame 6 and the mobile brewing head support 7, the annular element 34 of the lower capsule ejector 20 is sandwiched between the rim portion of the capsule 24 and the lower frame 6.

Now, when having finished the beverage production process the mobile brewing head support 7 is again lifted upwards (starting from the closed state as shown in FIG. 4 towards the open intermediate state of FIG. 5), the engagement pins 20a attached to the inner side of the control arm 35 will become engaged with the inclined ramp 7b such that the bent control arm 35 will turn around a bearing axis. This in turn will cause to rotate the annular member 34 of the capsule ejector 20 from the position as shown in FIG. 4 in which it rests on the upper surface of the lower frame 6, to a rotate position as shown in FIG. 5. At the same time the annular member 34 will engage with the outer rim of the capsule 24 (s. FIG. 5) and detach in a rotational movement the capsule 24 from the recession of the lower brewing head 9.

As will be explained later on, this rotational movement of the lower capsule ejector 20 will cause to slide the (used) capsule 24 backwards into a tray (not shown in the drawings).

Due to the engagement of the bent control arm 35 of the lower capsule ejector 20 and the ramp 7b of the mobile brewing head support 7 this detachment action lifting the capsule 24 from the lower frame 6 is actively controlled by a mechanical coupling to the opening transfer movement of the mobile brewing head support 7.

Further features of the invention will now be explained referring to the cross sectional view of FIGS. 6 to 8.

Figure 6:
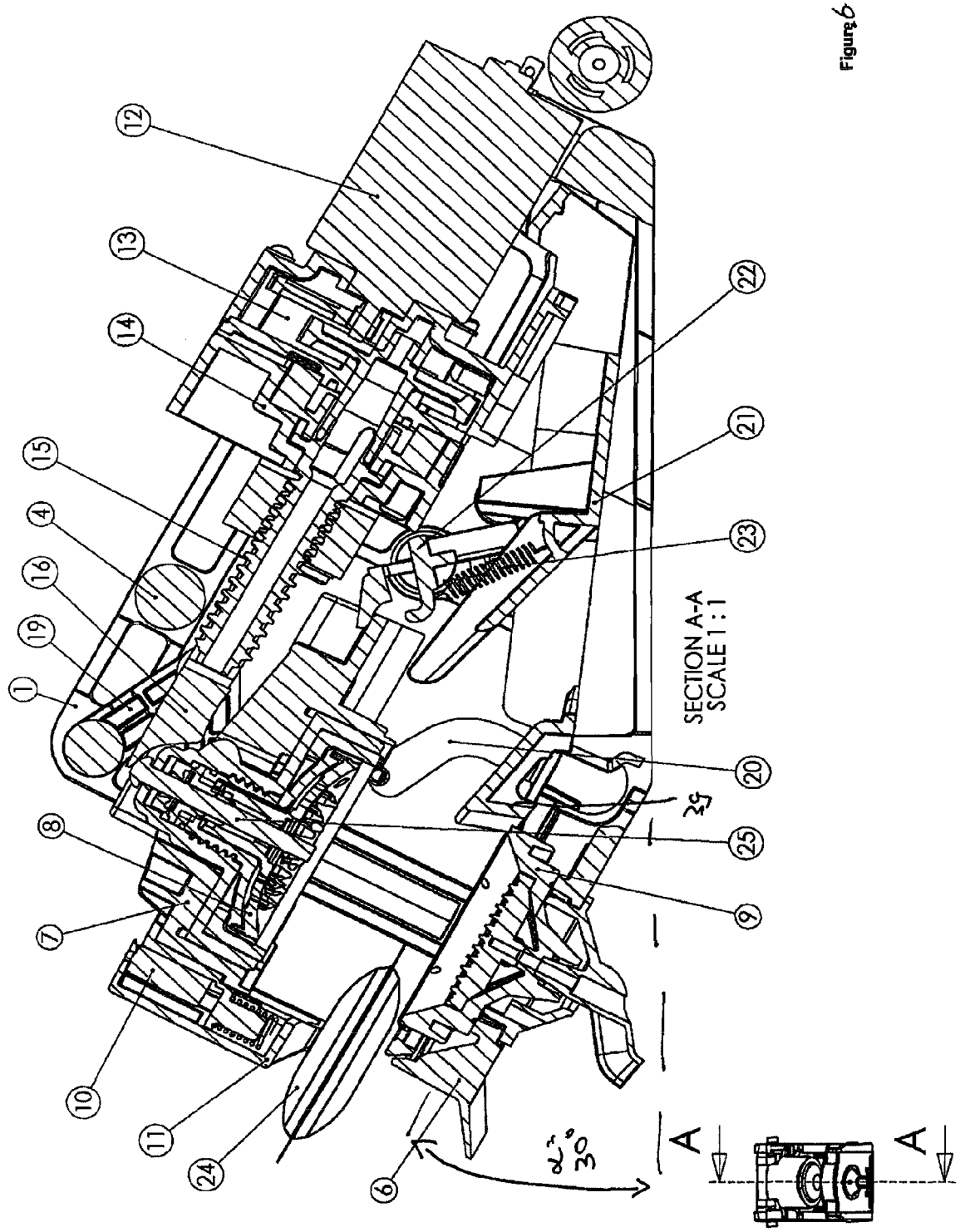
FIG. 6 shows a cross sectional view of a extraction module in the open state comparable to FIG. 3.

FIG. 6 shows a cross sectional view in the extraction module according to the present invention in its open state.

A user is about to insert the capsule 24.

The lower capsule ejector 20 is in a position where the outer rim portion of the capsule 24 will sandwich the annular member 34 of the lower capsule ejector 20 with regard to the lower frame 6.

As will be explained in the following, also a detaching action with regard to the mobile brewing head support 7 is mechanically and actively coupled to the main movement of the mobile brewing head support 7. In order to detach the capsule from the mobile brewing head support 7, and especially in order to detach the capsule from water injection means 36 housed in a concave portion of the mobile brewing head support 7, an upper capsule ejector 25 is provided. In the position as shown in FIG. 6 this upper capsule ejector 25 is in an retracted position. Generally, the upper capsule ejector 25 is moveable between the retracted position as shown in FIG. 6 and an advanced position which will be explained later on (s. for example FIG. 8). The movement of the upper capsule ejector 25 is actively controlled by the interaction of the upper end of the upper capsule ejector 25 with a control cam 37 which is fixed in translation to the shaft 16. Therefore, the current relative position of the upper capsule ejector 25 vis-à-vis the mobile brewing head support 7, e.g. in the retracted or advanced position, depends on the current position of the shaft 16 (driven by the spindle 15) and the particularly designed shape the control cam 37.

In FIG. 6 also the security system comprising the spring-biased sliding door 11 and the security switch 10 can be seen.

Furthermore, a capsule holder 21 is depicted in FIG. 6, which can carry out a rotational movement, which is controlled by the interaction of a steering axis 22 and a spring 23 with the mobile brewing head support 7 which will be explained in detail later on.

In any case, the capsule holder 21 is provided with a stop wall 39. In the position as shown in FIG. 6 the stop wall 39 extends beyond the reception claim of the lower brewing head 9 of the lower frame 6. Therefore, when the user is inserting a capsule 24 as shown in FIG. 6, this insertion is facilitated by having the stop wall 39 protruding upwards from this reception plane.

Figure 7:
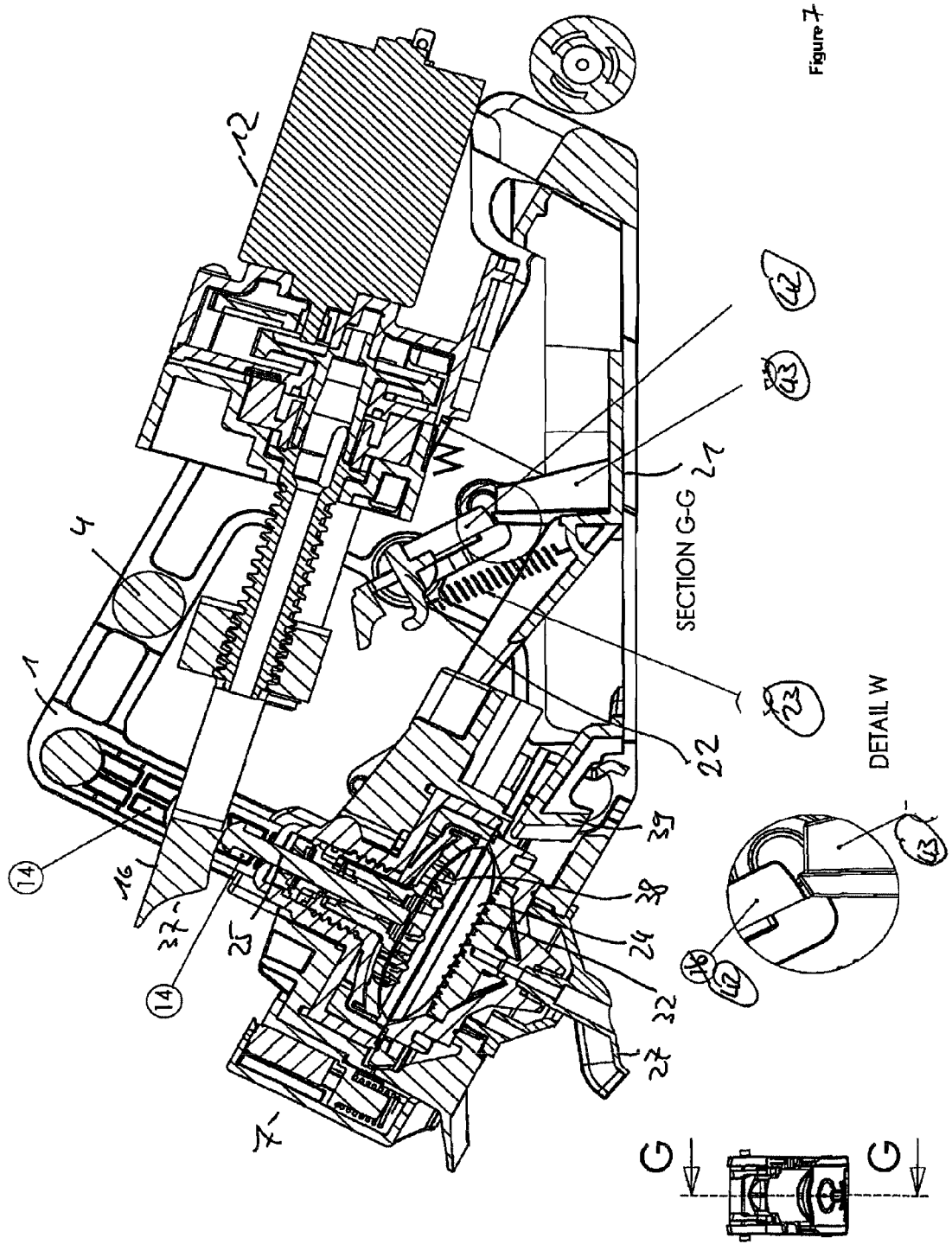
FIG. 7 shows a cross sectional view of an extraction module of the present invention in its closed state essentially corresponding to FIG. 4.

When the motor 12 drives the mobile brewing head support 7 into the closed position as shown in FIG. 7, the water injection means 38 are pushed inside the upper surface of the capsule 24. In this position as shown in FIG. 7 water under pressure can enter the capsule 24 and the interaction with the beverage ingredients contained in the capsule 24 can commence.

At the same time, the perforation means 32 have already open the lower surface of the capsule 24 and a produced beverage can be collected and drained through the draining channel 27.

From FIG. 7 can also be seen that in this closed position of the extraction module the upper capsule ejector 25 is in its most retracted position. This retracted position is controlled by the control cam 37 provided at the end of the shaft 16.

When the mobile brewing head support 7 is transferred from the open position as shown in FIG. 6 to the closed position as shown in FIG. 7, the initially upstanding stop wall 39 of the capsule holder 21 will be pushed downwards by the mobile brewing head support 7. When the capsule holder 21 having the stop wall 39 is rotated (counter-clockwise in the drawings), a spring 23 will be tensioned. The tensioned spring 23 causes the steering axis 22 to rotate counter-clockwise, such that a downwards extending stopper arm 42 of the steering axis 22 will be rotated on top of an upstanding stop 43 of the capsule holder 21. As a result, the capsule holder 21 is blocked in its lower position shown in FIG. 7 due to the blocking effect of the stopper arm 42 and the stop 43.

A comparison of FIGS. 6 and 7 shows that the motor 12, the gear box 13, the motor block support 14, the spindle 15 and the shaft 16 are not fixedly mounted to the main frame 26, but are allowed to carry out a swivel movement during a closure and opening transfer movement, respectively, of the jaw members 6, 7.

The mentioned motor block parts (the motor 12, the gear box 13, the motor block support 14, the spindle 15 and the shaft 16) are actually fixed free in rotation to the main frame 26 by the motor block bearing axis 41 (see e.g. FIG. 3).

When, starting from the closed beverage production state as shown in FIG. 7, the mobile brewing head support 7, driven by the motor 12 is moved upwards again, the capsule holder 21 will not immediately follow this movement due to an interaction of the capsule holder 21 with the steering axis 22.

This delay of the rotation of the capsule holder 21 makes it possible that the lower capsule ejector 20 lifts, as shown in FIG. 9, in a rotational movement the capsule 24 from its recessed position, such that the capsule 24 will eventually (as shown in FIG. 9) slide from the inclined lower capsule ejector 20 over a sliding surface 40 of the capsule holder 21 and backwards into a tray (not shown).

This rearward displacement of the capsule 24 is promoted by the fact that the extraction module is preferably mounted in the beverage production device such that it is inclined rearward by an angle of e.g. 30°. Thus the rear portion of the lower brewing head 9 is positioned lower than the front portion thereof.

During the opening movement, i.e. the upwards movement of the mobile brewing head support 7, the control cam 37 of the shaft 16 will cause a relative protruding movement of the upper capsule ejector 25 vis-à-vis the water injection means of the upper brewing head 8. This detaching action of the upper capsule ejector 25 vis-à-vis the upper brewing head 8 occurs before the annular member 34 of the lower capsule ejector 20 will lift the capsule 24 from the lower frame 6 in a rotational movement.

This delay of the detaching action of the upper capsule ejector 25 and the lower capsule ejector 20, respectively, is defined by the corresponding designs of the control cam 37 of the shaft 16 and the bent control arm of the lower capsule ejector.

Figure 8:
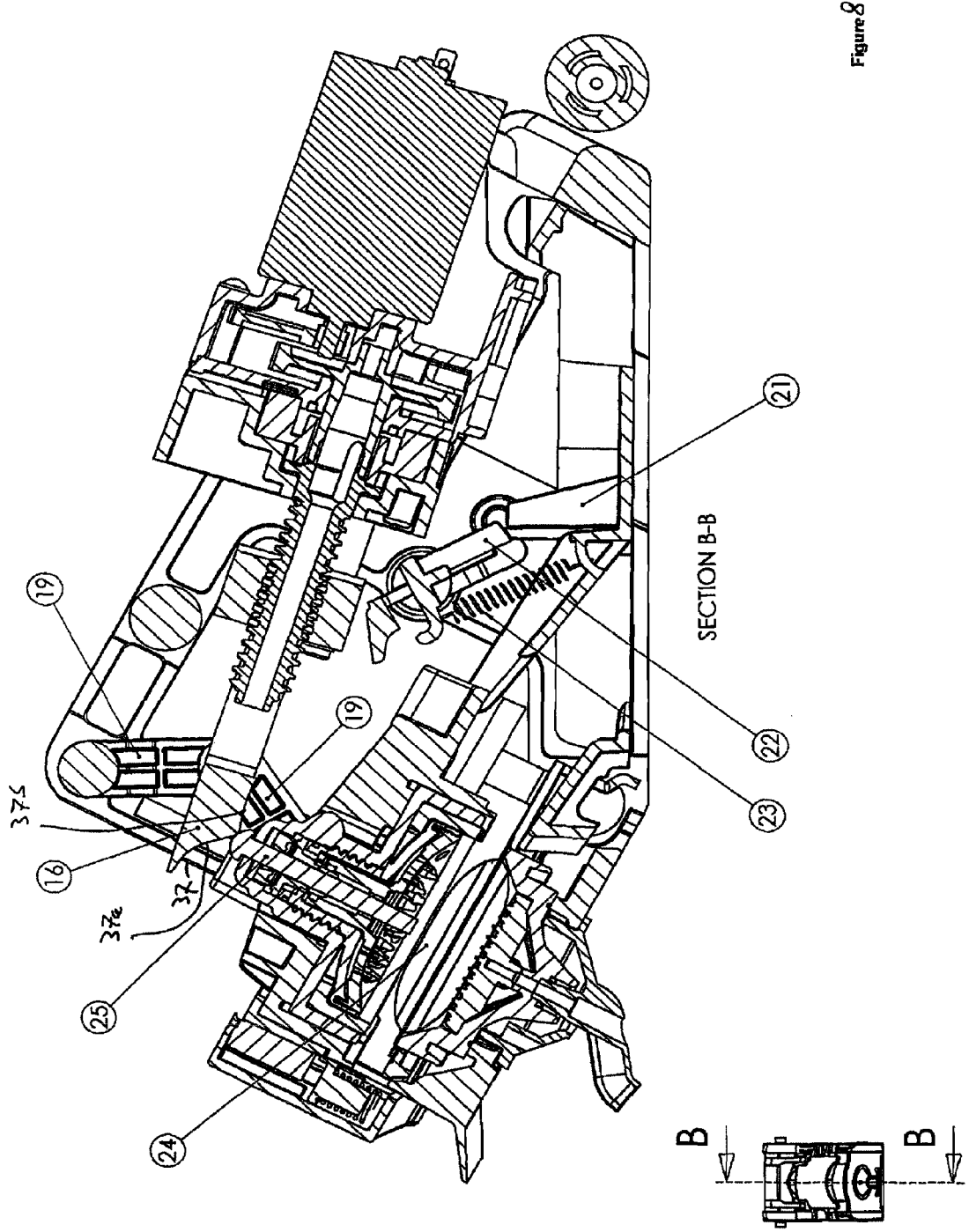
FIG. 8 shows a cross sectional view of the extraction module according to the present invention during its transfer movement from its close state to the open state, such that FIG. 8 is essentially corresponding to FIG. 5.

As can be seen from FIG. 8, when the shaft 16 is retracted by the motor 12 starting from the closed position as shown in FIG. 7, the upper capsule ejector 25 is held in position by a first section 37b of the control cam 37, while the upper brewing head 8 is already moving upwards. This corresponds to a relative protrusion movement of the upper capsule ejector vis-à-vis the upper brewing head 8 such that the capsule 24 will be actively detached from the perforation and injection means 32.

Only when the shaft 16 is retracted to an extent that the upper capsule ejector 25 start cooperating with a second, recessed section 37b of the control cam 37, the upper capsule ejector 25 is free to follow the upwards movement of the upper brewing head 8.

In the state during the opening (upwards) movement of the upper brewing head 6 shown in FIG. 8, the capsule holder 21 is still blocked in its lower position.

However, when the upwards opening movement reaches the position shown in FIG. 9, a upper cam 44 of the steering axis is rotated clockwise by a recession 45 of the mobile brewing head support 7 such that the blocking effect of the steering axis 22 ceases and the capsule holder 22 can resume its upper position shown in FIG. 6, in which the stop wall 39 defines a rear stop when inserting the next capsule 24.

To summarise, as a main action the motor 12 drives the opening/closure movement of the extraction module. Coupled to this main action is the delayed action of the detaching means for the upper jaw and the lower jaw, respectively. Finally, also the driving of the displacements of the capsule holder 21 are mechanically coupled to said main action.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A device for producing a beverage from a capsule, comprising:
   an extraction module comprising a first jaw member and a second jaw member, in an opened state of the extraction module the jaw members are separated from each other while in a closed state the jaw members enclose a capsule space;
   a motor for driving a transfer of the extraction module between the closed state and the opened state; and
   a security system comprising a sliding door and further comprising a security sensor which enables the motor to move the extraction module from the opened state to the closed state only if no obstacle is sensed in a space between the two jaw members, and the sliding door is configured such that an obstacle contacted during downward movement of the door pushes the door upward against the biasing action of a spring to activate the sensor.

2. The device of claim 1, wherein the first jaw member is an upper jaw that moves downward toward a lower jaw that is the second jaw member, and the security system is configured such that activation of the security sensor stops downward movement of the first jaw.

3. The device of claim 1, wherein the first jaw member is an upper jaw that moves downward toward a lower jaw that is the second jaw member, and the security system is configured such that activation of the security sensor inverts the rotation direction of the motor to move the upper jaw upward.

4. The device of claim 1, wherein the sliding door is attached to one of the jaw members and is parallel to the direction of movement of the jaw member.

5. The device of claim 1, wherein the sliding door is attached to one of the jaw members on an opposite side from the motor.

6. The device of claim 1, wherein the first jaw member is an upper jaw, and the spring extends downward from the first jaw member.

7. The device of claim 1, wherein the sliding door is on a front side of the device through which the capsule is received.

8. The device of claim 1, wherein the sliding door, the spring and the security sensor are attached to the same one of the jaw members.

9. The device of claim 8, wherein rotary drive action of the motor is converted into a linear relative movement of the first and second jaw members.

\* \* \* \* \*